United States Patent [19]

Matthews

[11] 4,426,849

[45] Jan. 24, 1984

[54] GRAVITY HEAD REHEAT METHOD

[75] Inventor: Hugh B. Matthews, Boylston, Mass.

[73] Assignee: Sperry Corporation, New York, N.Y.

[21] Appl. No.: 247,435

[22] Filed: Mar. 25, 1981

[51] Int. Cl.³ .............................................. F03G 7/00
[52] U.S. Cl. .................................. 60/641.4; 417/379
[58] Field of Search ......................... 60/641.2, 641.4; 165/45; 417/379

[56] References Cited

U.S. PATENT DOCUMENTS

| 2,461,449 | 2/1949 | Smith et al. | 165/45 |
| 3,857,244 | 12/1974 | Faucette | 60/641.2 |
| 4,142,108 | 2/1979 | Matthews | 60/398 |

OTHER PUBLICATIONS

Fundamentals of Classical Thermodynamics, Sect. 9.3, "The Reheat Cycle", p. 305, John Wiley and Sons, 1978, (Van Wylen, G. J., Author).

Primary Examiner—William R. Cline
Assistant Examiner—John M. Kramer
Attorney, Agent, or Firm—Howard P. Terry

[57] ABSTRACT

In a gravity head geothermal energy conversion system, downwardly flowing working fluid is supplied to a downwell turbine pump in heat transfer relationship to the upwardly flowing geothermal brine. The working fluid which is used to drive the downwell turbine pump is reheated by conveying the working fluid upward in heat transfer relationship with the geothermal brine to a predetermined point.

1 Claim, 3 Drawing Figures

GRAVITY HEAD REHEAT METHOD

BACKGROUND OF THE INVENTION

1. Field of the Invention

The invention relates generally to efficient means for the generation of electrical or other power utilizing energy from subterranean geothermal sources and, more particularly, relates to novel arrangements including efficient deep well heat exchange and pumping equipment for application in deep hot brine wells for the transfer of thermal energy for use at the earth's surface.

2. Description of the Prior Art

A basic advance in the geothermal power extraction art, not limited to use with the rare dry steam geothermal sources and also devoid of the steam and geothermal brine separation problems and the consequent corrosion problems attached to prior art systems using mixed steam and hot water supply wells was presented in the H. B. Matthews U.S. Pat. No. 4,142,108, issued Feb. 27, 1979, entitled "Geothermal Energy Conversion System".

The aforementioned patent discloses a geothermal energy recovery system of improved efficiency which makes use of thermal energy stored in hot, solute-bearing well water as it is pumped upward to the earth's surface through an extended heat exchange element for continuously heating a downward flowing organic fluid to a supercritical state. Some of the energy of the latter fluid is used within the well for operating a turbine-driven pump for pumping the hot, solute-bearing well water at high pressure and always in liquid state to the earth's surface, where it is reinjected into the earth in another well. The temperature difference between the upward flowing brine and the downward flowing organic fluid is maintained finite in a predetermined manner along the subterranean extended heat exchange element. After driving the deepwell turbine-driven pump, the organic fluid arises to the earth's surface in a thermally insulated conduit; at the earth's surface, vapor turbine electrical power generation equipment is driven by the heated organic fluid which is then returned into the well for reheating in the extended heat exchanger.

A major advance of the above described system over prior art geothermal energy conversion system resides in the deep well heat exchange element wherein the pressure and temperature of the downward flowing organic fluid increases continuously, due to the gravity head pressure and the heat transfer with the upward flowing brine, respectively, and are manipulated by the apparatus of the invention, such that the specific heat characteristic of the organic fluid may be adjusted to achieve the most efficient heat transfer between the organic fluid and the brine.

The temperature characteristics of the particular source of brine, however, may be such that the most efficient heat transfer between a particular organic fluid and the brine is not attainable. For example, the source of brine may be characterized as having insufficient temperature, and if so, there will be a loss of efficiency. Moreover, it is highly probable that even an ideal source of brine may "cool off" and exhibit insufficient temperature conditions once it has been exploited for a substantial period of time. Accordingly, it is neither practical nor desirable to adapt each gravity head system to accommodate a different type of organic working fluid depending upon the temperature and/or pressure conditions of a particular source of brine.

SUMMARY OF THE INVENTION

The present invention is an improvement over the prior art gravity head type of geothermal systems and allows a particular organic working fluid to be utilized with sources of brine which have widely varying temperature conditions. Furthermore, the apparatus of the present invention allows a source of geothermal energy to be more efficiently exploited even after a number of years when there is a tendency for the geothermal source to "cool off".

The invention is a geothermal energy recovery system of improved efficiency that makes use of thermal energy stored in hot, solute-bearing well water which may have widely varying temperature conditions. The well water or hot brine is pumped upward to the earth's surface through an extended lineal heat exchange element for continuously heating a downward flowing organic working fluid. The added energy of the latter fluid is then used within the well for operating a turbine-driven pump for pumping the hot, solute-bearing well water at high pressure and always in liquid state to the earth's surface, where it is reinjected into the earth by a sump well. The temperature difference between the upward flowing brine and the downward flowing organic working fluid is maintained finite in a predetermined manner along the length of the subterranean extended heat exchange element. After driving the deep well turbine-driven pump, the organic fluid is reheated as it rises through a non-insulated conduit. At a predetermined point the organic fluid is directed into a thermally insulated conduit for passage to the surface of the earth. The organic working fluid is then used to drive electrical power generation equipment, generally located at the earth's surface, and after which it is then returned into the well for reheating as it travels downward in the extended heat exchanger.

More specifically, the pressure and temperature of the downward flowing organic fluid increases continuously, due to the gravity head pressure and the heat transfer with the upward flowing brine, respectively, and are manipulated by the apparatus of this invention, such that the specific heat characteristic of the organic fluid may be adjusted to allow maximum heat transfer between the organic fluid and the brine.

DESCRIPTION OF THE PREFERRED EMBODIMENT

Figure 1A:
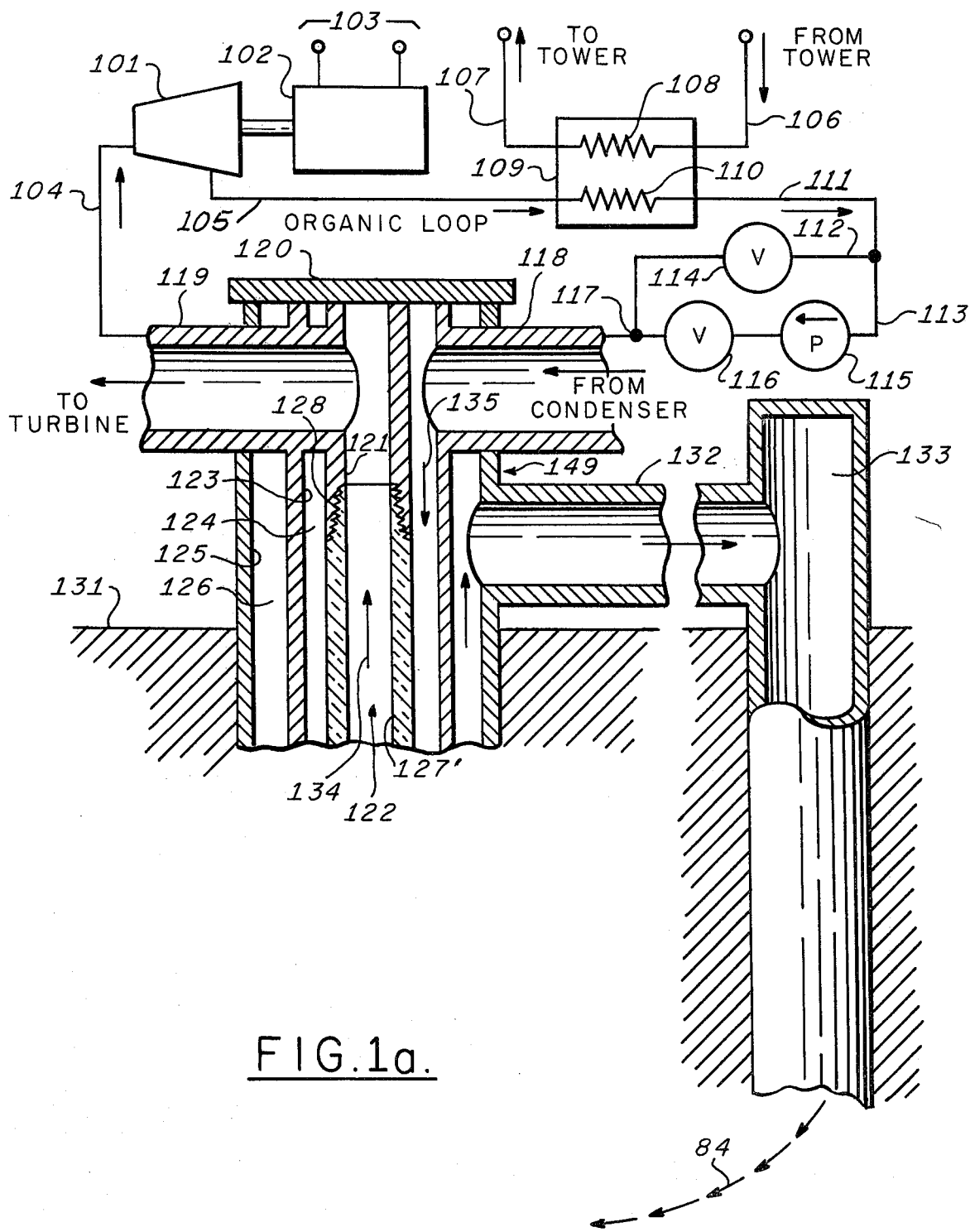
FIGS. 1a and 1b comprise an elevation view, partly in cross-section, of the novel geothermal system of the present invention.
Figure 1B:
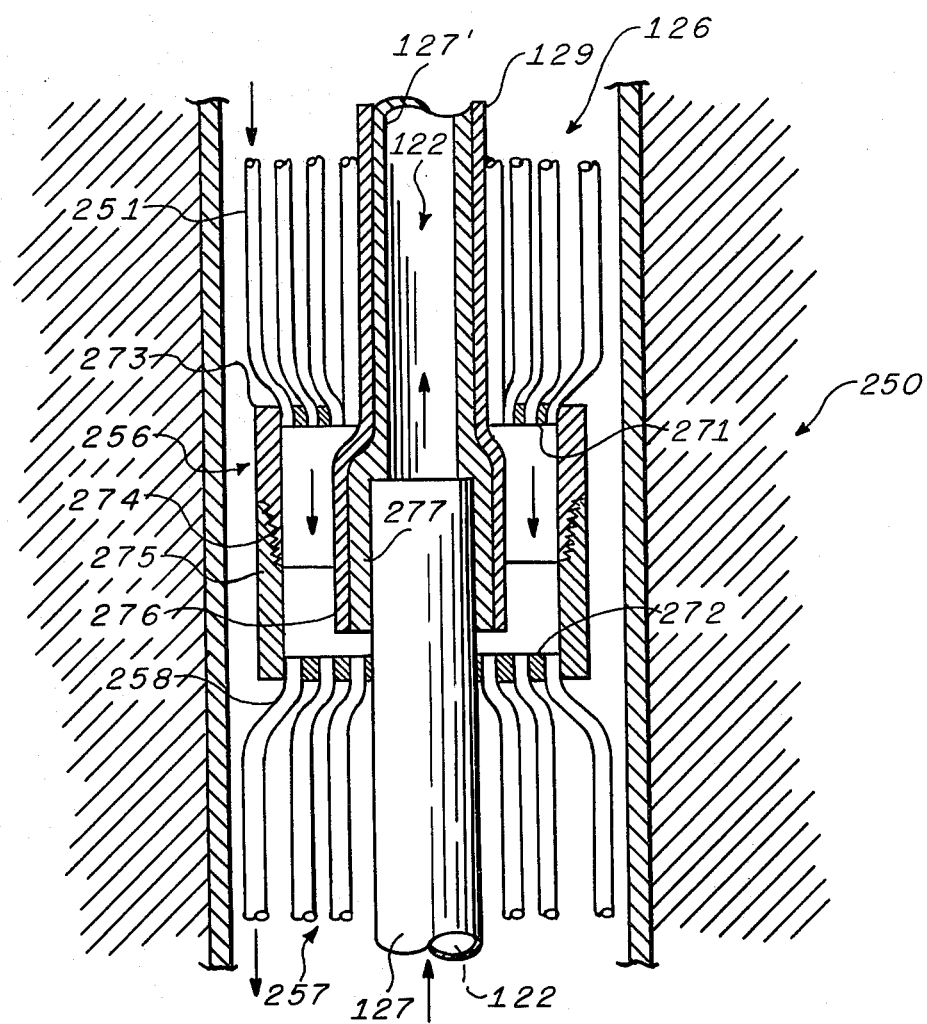
Figure 1B:
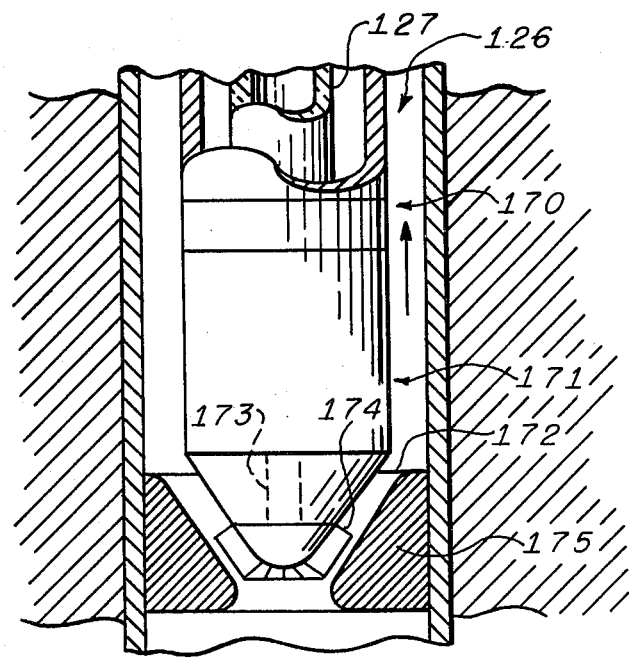

Referring now to FIGS. 1a and 1b, illustrated therein is a simplified surface energy conversion system cooperating with a geothermal energy extraction system, the latter again being disposed in a deep well extending into strata providing a copious supply of geothermally heated water or brine under relatively high pressure. The deep well apparatus again includes active brine pumping apparatus located within a well casing 125 below the pressure level of the brine at which flashing would take place. The configuration of FIG. 1 includes a well head section 149 located partly above the earth's surface 131 and extending downward. Toward the geothermal source, extensions of the well piping directly join a fluid turbine motor section 170, a supporting rotary bearing section 171, and a hot water pumping section 172 following in close succession at increasing depths.

The well casing 125 extends downward from the surface capping or header plate 120, surrounding in generally concentric relation a relatively large pipe 123 cooperatively forming a conduit 126 for permitting upward flow of the hot geothermal brine always in liquid state. An annular conduit 124 is formed between pipe 123 and an innermost pipe 121 and is coupled to a heat exchanger 250 for permitting downward flow of an organic fluid in heat transfer relation with the upward flowing brine. A further conduit 122 is formed by an insulated pipe 127' and an uninsulated pipe 127 for permitting upward flow of the heated organic fluid.

Intensive subterranean heat exchange is achieved between the upward flowing hot geothermal water in conduit 126 and the down flowing working organic fluid heated in the heat exchanger 250 to a supercritical state. The upward flowing hot geothermal water within annular conduit 126 is utilized in the apparatus of the present invention to reheat the upward flowing working fluid in the lower uninsulated pipe 127. For this purpose, the upper insulated pipe 127' is constructed of insulating material, whereas the lower uninsulated pipe 127 is constructed of metal or some other heat conductive material. Preferably, the upper insulated pipe 127' is joined at the well head to metal inner pipe 121 in a conventional manner, as by threaded joint 128. It is imperative that the upper insulated pipe 127' be constructed of insulative material or be insulated to at least the well depth where the temperature of the upwardly flowing organic working fluid exceeds the temperature of downward flowing organic working fluid. The well depth where this temperature "crossover" typically occurs is approximately 400 to 500 feet below the earth's surface. The insulated pipe 127', however, may be extended to greater depth if less reheating is required. The total length of pipes 127' and 127 is a function of the geothermal well depth. The length of the uninsulated pipe 127, however, is a function of the temperature and/or pressure characteristics of a particular well. It should be noted that as the well tends to "cool off" the length of the uninsulated pipe 127 would be increased to achieve maximum efficiency from the well.

The upper insulated pipe 127' may be constructed in a conventional manner of molded refractory materials cast with a suitable binder and may contain glass, asbestos, or similar fibers. Alternatively, the upper insulated pipe 127' may be a steel pipe with a layer of conventional powdered thermal insulator material 129 sprayed or otherwise bonded to one or both of its cylindrical surfaces in a conventional manner. At the low end of the operating temperature scale, reenforced plastic pipes are suitable. The low uninsulated metal or heat conductive pipe 127 is preferably attached to a metal pipe located within turbine motor section 170 by threaded joints.

With the pump in pump section 172 operating, geothermal fluid or brine is propelled upward in conduit 126 always in liquid state by the action of pump vanes 174 driven via shaft 173 by the fluid turbine motor of section 170. During its initial ascent within conduit 126, there is intensive heat transfer from the hot geothermal water to the down-flowing working fluid in the heat exchanger 250 and through the walls of the lower uninsulated portion of pipe 127 into the upward flowing working fluid. As taught in the aforementioned U.S. Pat. No. 4,142,108, an increasingly complex heat exchanger 250 comprised of an increasing number of heat exchange pipes 257 is coupled to the annular conduit 124 to increase the rate of heat exchange between the rising brine and the down-flowing working fluid.

Heat exchanger 250 is comprised of a number of sections which become more complex near the surface of the earth, and for the purposes of simplicity only a representative section of heat exchanger 250 is illustrated in FIG. 1b. The heat exchanger 250 includes a representative manifold, such as manifold 256 and its input and output heat exchanger pipes. Manifold 256, having an array of input pipes such as pipe 251 serves to couple the downward flowing working fluid into the next lower heat exchanger unit 257 made up of pipes like pipe 258. The manifold 256 is shown as surrounding the upper insulated pipe 127'. Insulated pipe 127' is lined with the insulating material 129 and together with uninsulated pipe 127 form the interior conduit 122. A conventional sliding joint at interface 277 is made between upper pipe 127' and lower pipe 127, and the interface 277 may be provided with a conventional seal mechanism.

Manifold 256 is composed of separate parts fastened together at the annular pipe-threaded joint 274. The lower portion of manifold 256 includes an apertured header 272 for receiving the heat exchanger pipes 258 of heat exchanger unit 257. Header 272 is connected to pipe 127 in leak-proof fashion. The lower portion further includes a threaded cylindrical shell 275. In a similar manner, the upper portion of manifold 256 includes an apertured header 271 bonded to pipe 127' for receiving the heat exchanger pipes 251 of heat exchanger unit 250. The upper part of manifold 256 also includes a threaded cylindrical shell 273 whose threads match those of shell 275. In this manner, the rate of heat exchange from the rising brine to the down-flowing working fluid is progressively increased from the bottom to the top of the structure as the working fluid flows from the relatively fewer pipes 258 of lower heat exchanger 257 to the larger number of pipes 251 of heat exchanger unit 250, thereby providing incrementally increasing thermal exchange. The working fluid, therefore, flows downward in the heat exchanger 250 and the geothermal brine flows upward in conduit 126 and out through branching outlet pipe 132 at the earth's surface 131, thus being conducted in considerably cooled form to a reinjection well 133. Accordingly, the energy extraction cycle may be continuously repeated.

The organic working fluid introduced by branching surface pipe 118 into conduit 124 flows downward in the well in the heat exchanger 250 in considerable volume so that a major part of the geothermal energy is transferred to the working fluid by the time it reaches the turbine motor of section 170 in supercritical state. After furnishing energy for driving the turbine, shaft 173, and vanes 174 of the brine pump, the partially cooled fluid flows upward in pipes 127 (where it is reheated) and 127' and out through series branching pipes 119, 104 to the input of a conventional multistage vapor turbine 101. In this manner, energy is provided by the vapor forming at the input nozzles of turbine 101 to drive the surface-located alternator or generator 102 for supplying electrical power at output terminals 103.

The vapor consequently appearing at the output stage of turbine 101 and flowing through pipe 105 is reconverted into a liquid by the action of condenser element 110 of condenser 109. Cooling of condenser 109 is provided by flow of water, for example, from a cooling tower (not shown) through pipe 106, condenser element 108, and back to the tower through pipe 107. In normal operation, the organic working fluid flows through pipes 111, 112, the open valve 114, through tee 117, and into branching pipe 118 for recycling.

Figure 2:
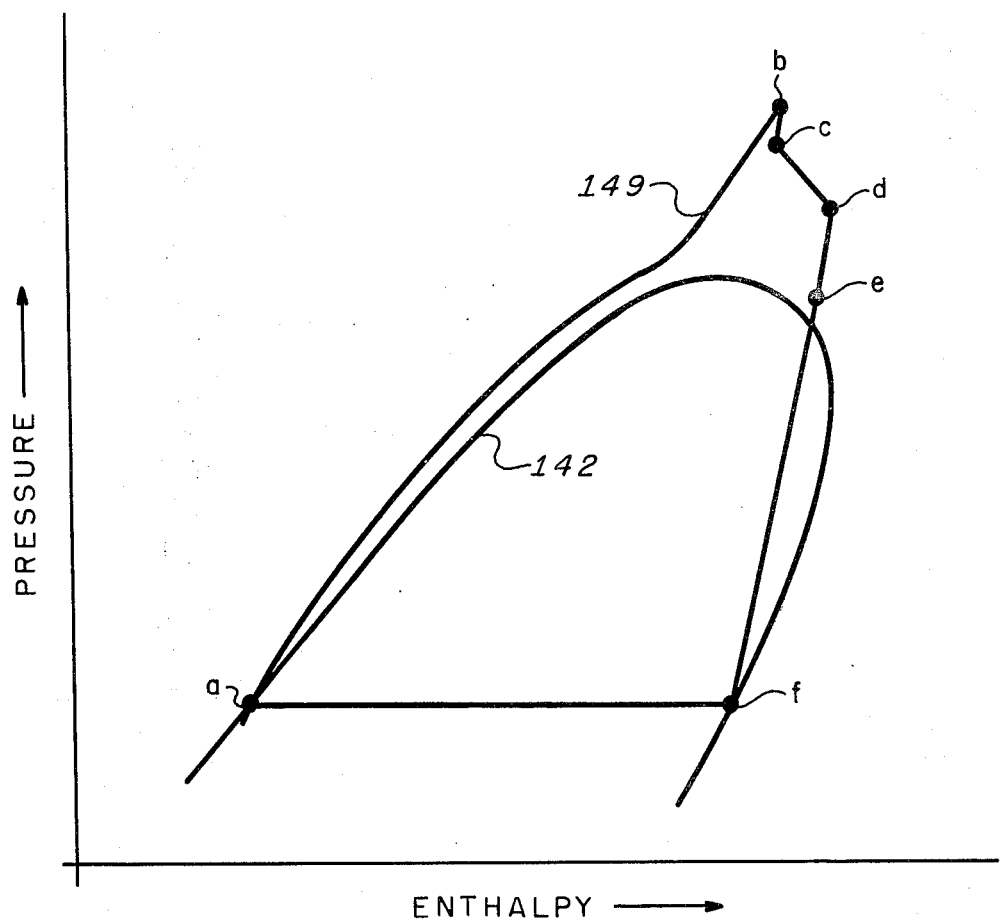
FIG. 2 is a graph useful in explaining the operation of the present invention.

Referring now to the pressure-enthalpy diagram of FIG. 2, the operation and the advantages of the apparatus of the present invention may be more fully appreciated. The pressure-enthalpy diagram includes curve 149 which represents a gravity head geothermal energy system utilizing the present invention and curve 142 which represents the boundary of the dual phase region of the working fluid. In the gravity head system of FIG. 1 the working fluid is conveyed downwell in the heat exchanger 250, picking up heat from the rising brine in conduit 126, to a depth of approximately 2000 feet. Consequently, there is an attendant increase in enthalpy by contributions from the brine and potential energy, and there is an increase in pressure from gravity, as represented by points a-b. When the heated and pressurized working fluid reaches the bottom of the well, work is expended in the downhole turbine section 170 to drive a pump impeller, as represented by points b-c. Points c-d represent the expenditure of lift work, reheating by the brine as the working fluid passes through the uninsulated pipe 127, and a depressurizing of the working fluid due to a lessening of the gravity head. Points d-e represent the expenditure of lift work in the insulated pipe 127' and a further lessening of the gravity head. Points e-f represent the work expended in driving the surface turbine 101, and points f-a represent the condensation of the working fluid.

It can be appreciated, therefore, that the apparatus of the present invention provides for the manipulation of the pressure-enthalpy diagram, associated with a particular geothermal well in order to achieve its most efficient exploitation. The reheating of the working fluid which results from the uninsulated pipe 127 has the effect of moving point d further to the right, and thereby making curve 149 more closely fit curve 142, which results in more efficient operation of the system.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for recovery of thermal energy from a hot source of fluid within the interior region of the earth comprising:

heat exchanging means extending substantially from a first station adjacent said surface of said earth to a second station within said earth for downwardly conveying a working fluid initially in a relatively cool state from said first station to said second station and converting said fluid into energetic fluid in a supercritical state, wherein said heat exchanging means includes tubular means for increasing the heat transfer from the hot source of fluid to the working fluid from the second station to the first station, motive means at said second station operatively coupled to said heat exchanging means and responsive to the flow of the energetic working fluid, pump means at said second station operatively coupled to and responsive to said motive means for pumping the hot source of fluid from said interior regions through said heat exchanging means in heat transfer relationship with said working fluid, conductive conduit means for reheating and upwardly conveying said working fluid after partial cooling due to transferring energy to drive said motive means, said conduit extending from a point beyond said motive means upwards to a point where the temperature of said upwardly conveyed working fluid exceeds the temperature of said downwardly flowing working fluid so as to extract additional heat energy from said downwardly flowing working fluid and said hot source of fluid, whereby heat is regained to compensate for said partial cooling, and insulative conduit means disposed between said conductive conduit and said first station, for upwardly conveying said energetic working fluid from said conductive conduit means to said first station.

* * * * *